UNITED STATES PATENT OFFICE.

PAUL A. STARKE, OF BERKELEY, CALIFORNIA.

PROCESS FOR THE SYNTHETIC PRODUCTION OF CYANIDS.

1,256,272.  Specification of Letters Patent.  Patented Feb. 12, 1918.

No Drawing. Application filed September 11, 1916. Serial No. 119,575.

*To all whom it may concern:*

Be it known that I, PAUL A. STARKE, a citizen of the United States, residing at Berkeley, in the county of Alameda and State of California, have invented certain new and useful Improvements in Processes for the Synthetic Production of Cyanids, of which the following is a specification.

My invention relates to the synthetic production of cyanids by the reaction of a mixture of a hydrocarbon gas and ammonia in the presence of a reactive mass.

In a prior United States Patent No. 1,206,155, Nov. 28, 1916, granted to me jointly with Eric A. Starke, we disclose a process of passing a mixture of methane and air through a special catalyzer, whereby at a high temperature cyanids are formed which may then, if desired, be converted, as by superheated steam, into formates and ammonia, the latter being recovered by condensation.

I have now found that hydrocarbon gas, and particularly mixtures of paraffin hydrocarbons, as, for example, natural gas, when mixed in the first instance with ammonia will react, under a given range of temperature, in the presence of an alkaline reactive mass, to form cyanids, either sodium or potassium cyanid according to the composition of the reactive mass.

This is my present invention, and I may now particularly describe it as follows: The reactive mass agent is composed of alkaline substances to which a metal of the iron group, such as iron, nickel, cobalt, chromium or aluminum is best added to accelerate the reaction. In its best form it comprises a mixture of sodium carbonate, magnesium oxid, and iron, the latter being either finely divided metallic iron, an oxid or one of the salts of iron.

As an example, the proportions of these components of the reactive mass may be given, as follows: Sodium carbonate 20 parts; magnesium oxid 30 parts; metallic iron 50%. This mixture is prepared by grinding it thoroughly and then placing it in a furnace and heating it up to, say between 400 and 800 degrees centigrade. No carbon is included as a chemical reactive agent, but I may state that the inclusion of a small amount of carbon to increase the porosity of the mass may be a benefit. Instead of carbon, for this purpose, I may include in the mixture some sticky substance such as crude oil or molasses.

The gaseous mixture is composed of hydrocarbon gas and ammonia. The hydrocarbons used may be various, and either artificially prepared or natural. I prefer some form of saturated hydrocarbons, such as methane, or its homologues which fully furnish the carbon necessary for the reaction; and, on account of its abundance and availability I prefer natural gas which is a mixture of saturated hydrocarbons. As an example of my gaseous mixture I give one part by volume of ammonia and 10 parts of natural gas, though I do not confine myself to these proportions.

In carrying out my process, I place the reactive agent in a retort and heat it up to a temperature not less than say 1000 degrees centigrade, and while under the heat I pass the gaseous mixture of natural gas and ammonia through it. By consequent reaction the cyanid is formed and may be recovered in any suitable manner, as, for example, by lixiviation and subsequent crystallization of the cyanid.

I claim:—

1. The process for the synthetic production of cyanids which consists in passing a mixture of hydrocarbon gases and ammonia through a heated reactive mass comprising substances capable of reacting to form cyanid therein, and then recovering said cyanid.

2. The process for the synthetic production of cyanids which consists in passing a mixture of hydrocarbon gas and ammonia through a heated reactive mass composed of alkaline substances and a metal of the iron group, to form cyanid therein, and then recovering said cyanid.

3. The process for the synthetic production of cyanids which consists in passing a mixture of hydrocarbon gas and ammonia through a heated reactive mass devoid of carbon as a chemical reactive agent and comprising substances capable of reacting to form cyanid therein, and then recovering said cyanid.

4. The process for the synthetic production of cyanids which consists in passing a mixture of hydrocarbon gas and ammonia through a heated reactive mass devoid of carbon as a chemical reactive agent and composed of alkaline substances and a metal of the iron group, to form cyanid therein, and then recovering said cyanid.

5. The process for the synthetic production of cyanids which consists in passing a mixture of hydrocarbon gas and ammonia through a reactive mass at a temperature of approximately 1000 degrees centigrade, said mass comprising substances capable of reacting to form cyanid therein, and then recovering said cyanid.

6. The process for the synthetic production of cyanids, which consists in passing a mixture of hydrocarbon gas and ammonia through a reactive mass composed of alkaline substances and a metal of the iron group, at a temperature of approximately 1000 degrees centigrade, to form cyanid therein, and then recovering said cyanid.

7. The process for the synthetic production of cyanids which consists in passing a mixture of hydrocarbon gas and ammonia through a reactive mass devoid of carbon as a chemical reactive agent, at a temperature of approximately 1000 degrees centigrade, said mass comprising substances capable of reacting to form cyanid therein, and then recovering said cyanid.

8. The process for the synthetic production of cyanids which consists in passing a mixture of hydrocarbon gas and ammonia through a reactive mass devoid of carbon as a chemical reactive and composed of alkaline substances and a metal of the iron group, at a temperature of approximately 1000 degrees centigrade, to form cyanid therein, and then recovering said cyanid.

9. In the process for the synthetic production of cyanids by catalysis, that step which consists in subjecting a mixture of natural gas and ammonia, under a temperature of approximately 1000 degrees centigrade, to a reactive mass devoid of carbon as a chemical reactive agent, and comprising substances capable of reacting to form cyanid therein.

In testimony whereof I have signed my name to this specification in the presence of two subscribing witnesses.

PAUL A. STARKE.

Witnesses:
  WM. F. BOOTH,
  D. B. RICHARDS.